United States Patent [19]

Storey et al.

[11] Patent Number: 4,934,090
[45] Date of Patent: Jun. 19, 1990

[54] ICE FISHING ASSEMBLY

[76] Inventors: Ned Storey; Rosemary Storey, both of 7710 E. Houghton Lake Rd., Merritt, Mich. 49667

[21] Appl. No.: 401,614

[22] Filed: Aug. 31, 1989

[51] Int. Cl.⁵ ............................................. A01K 97/12
[52] U.S. Cl. ............................................. 43/17; 43/16
[58] Field of Search .................................. 43/17, 16, 4

[56] References Cited

U.S. PATENT DOCUMENTS

| | | | |
|---|---|---|---|
| 2,122,836 | 7/1938 | Gegerfeldt | 43/4 |
| 2,500,078 | 3/1950 | Ingram | 43/17 |
| 4,228,609 | 10/1980 | Gonnello | 43/16 |
| 4,270,297 | 6/1981 | Yates | 43/17 |
| 4,310,983 | 1/1982 | Irvin et al. | 43/17 |
| 4,823,494 | 4/1989 | Waterman | 43/17 |

Primary Examiner—Nicholas P. Godici
Assistant Examiner—James Miner
Attorney, Agent, or Firm—Terry M. Gernstein

[57] ABSTRACT

An ice fishing assembly signals a fisherman when a fish has struck and is running with the line, and also keeps a hole defined in the ice open. The various parts of the assembly can be customized according to the size and shape of the hole defined through the ice, and can be replaced as necessary. The circuit elements necessary for the signalling function are mounted in a flexible layer of insulation so that they are protected and need not be replaced to fit a new ice hole. The flexible layer will fit a variety of different holes and is fixed to a central tube while other layers are slidably mounted on that central tube to be replaceable. The flexible layer supports the other layers in place.

15 Claims, 3 Drawing Sheets

ICE FISHING ASSEMBLY

TECHNICAL FIELD OF THE INVENTION

The present invention relates to the general art of sporting equipment, and to the particular field of fishing equipment, specifically, ice fishing equipment.

BACKGROUND OF THE INVENTION

Ice fishing involves cutting a hole in an ice layer covering a body of water, and deploying a fishing line through that hole. The sport of ice fishing has long enjoyed great popularity. This popularity has even increased in recent years so that there are now great numbers of ice fisherman.

Ice fishing is often carried out in low, or no, light situations, such as at night, or the like. Furthermore, a single ice fisherman may have several lines working at the same time, and all must be monitored. While this is an efficient manner of ice fishing, it creates problems in monitoring all of the lines, especially if the lines are widely spaced and the ambient light is low.

While there are several known devices for signalling a strike, these devices are prone to providing false signals, especially if such devices are exposed to the environment, which can be quite harsh. This is particularly true of the mechanical devices, such as spring-loaded flags and the like. These devices may also not be fully effective for night ice fishing, especially if the lines are widely spaced apart.

Still further, many ice fishing holes tend to freeze over and must be constantly monitored for this reason as well. This creates still further activity and problems for the fisherman. While the art contains examples of ice shanties and the like which can cover an ice fishing hole, such devices are not amenable for efficient use in conjunction with a multitude of ice holes that are widely spaced apart and are being simultaneously worked. Furthermore, such devices may be cumbersome to store, transport and set up.

Therefore, there is a need for an ice fishing assembly that can maintain an ice fishing hole open and can also signal a strike in a reliable manner, even in a harsh environmental situation, that is readily identifiable, even in extremely low light conditions, yet which can be easily stored, transported and set up in the configuration that is most effective for the particular conditions encountered.

OBJECTS OF THE INVENTION

It is a main object of the present invention to provide an ice fishing assembly that can maintain an ice fishing hole open.

It is another object of the present invention to provide an ice fishing assembly that can maintain an ice fishing hole open and can also signal a strike in a reliable manner that is readily identifiable, even in extremely low light conditions.

It is another object of the present invention to provide an ice fishing assembly that can maintain an ice fishing hole open and can also signal a strike in a reliable manner that is readily identifiable, even in extremely low light conditions and which can be easily stored, transported and set up.

It is another object of the present invention to provide an ice fishing assembly that can maintain an ice fishing hole open in harsh and inclimate conditions, and can also signal a strike in a reliable manner that is protected from the environment, and that is readily identifiable, even in extremely low light conditions and which can be easily stored, transported and set up and customized for the particular conditions encountered.

SUMMARY OF THE INVENTION

These, and other, objects are achieved by an ice fishing assembly which includes a cylindrical tube having an ice fishing hole covering unit mounted thereon. The hole covering unit includes a pair of outer circular layers sandwiching a circular foam layer therebetween. This covering unit is inserted into an ice fishing hole, and will maintain that hole open.

The assembly further includes two signal lights that are activated when a fishing line containing reel moves to feed out line to a hooked fish. The lights are activated by a normally open magnetically activated reed switch that is closed when a permanent magnet mounted on the reel rotates therepast as the reel revolves to feed out the line.

The control unit for the light assemblies is in the foam layer and is thus protected from the environment. The outer layers can be cut to the size and configuration of the particular ice fishing hole desired, and replaced as necessary, while the foam layer is flexible so it can be deformed to such size and configuration and re-used. Thus, the electronic equipment is protected, and need not be replaced, with only the outer layers being replaced if the ice hole sizes and shapes are changed.

In this manner, the assembly is easy to transport, store and set up in the precise configuration and size desired, yet will provide a readily identifiable and reliable signal that the line is being fed out. The fisherman can check this line upon noticing the signal.

DETAILED DESCRIPTION OF THE PREFERRED EMBODIMENT OF THE INVENTION

Figure 1:
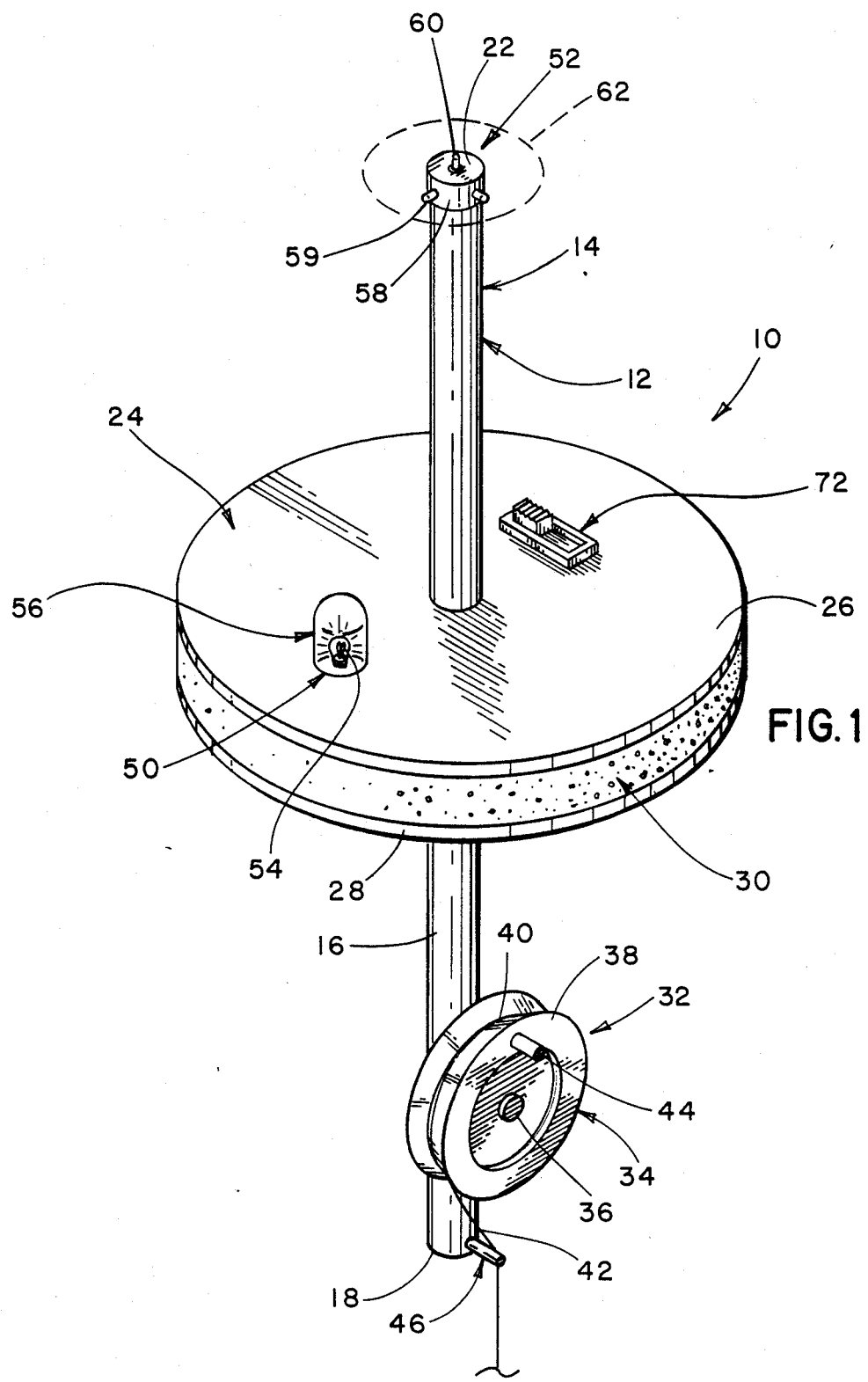
FIG. 1 is a perspective showing the ice fishing assembly embodying the present invention.

Shown in FIG. 1 is an ice fishing assembly 10 which can signal a fisherman in a reliable and noticeable manner and which is easily customized and set up and which can keep an ice fishing hole open.

The assembly includes a main tube 12 that will extend through the ice fishing hole to have an upper end 14 thereof located on top of the ice, and a bottom end 16 thereof located beneath the ice and in the water. The tube is cylindrical and hollow and includes a lowermost end 18 and an uppermost end 20 that is covered by a cap 22 and a wall connecting such ends together.

Mounted on the tube in a central location thereon is an ice fishing hole covering unit 24 which is inserted into a hole defined in the ice and abuts the ice adjacent to such hole. The unit 24 maintains the hole open and prevents it from freezing over, and thus is sized according to the needs of the particular fisherman. These units can be manufactured in various sizes, or can be manufactured of material, such as plastic, that can be cut. If the unit is manufactured of such material, the fisherman can customize the unit to the particular hole defined in the ice. In such a case, portions of the unit 24 are slidably mounted on the tube so that after one unit is customized and used, it can be replaced with another which will be sized and configured as necessary. Replacement units and/or replacement parts can be sold separately.

The unit 24 includes a top circular cover 26 and a bottom circular cover 28 with a circular layer of insulation 30, such as foam rubber, sandwiched therebetween. The various layers of the unit are shown in FIG. 1 as being concentric, but can be of different sizes and positioned at displaced locations if suitable to completely fill an ice fishing hole in a desired manner. In fact, as will be seen from the following discussion, the insulation layer may have a size that is different from the other layers as it may be used again and again with the outer layers 26 and 28 being changed.

A fishing line storage assembly 32 is mounted on the central tube near the bottom end 18 thereof to be located in the water during an ice fishing procedure. The line storage assembly 32 includes a circular storage reel 34 mounted on the central tube for rotation by a mounting pin 36. The reel includes two flanges, such as flange 38 that are separated and which are connected by a base 40 to define a line-storing channel for line 42. A handle 44 is attached to the reel to manually operate the line 42, and a line-guiding pin 46 is mounted on the tube near the reel to guide the line 42 onto and off of the reel.

In order to signal the fisherman that a fish has taken the bait and is running with the line, the assembly 10 includes a fish strike indicator system thereon. This system is intended to signal the fisherman in a reliable and readily identifiable manner that the line 42 is being fed off of the reel.

The system includes a first light 50 assembly mounted on the covering unit 24 and a second light assembly 52 mounted on the central tube at the top end thereof. These lights signal the fisherman in a visible manner, and it is noted that audible or other signal means can be included or substituted for the visible signal means without departing from the scope of the present invention. For example, the assembly 10 can include a remote control assembly that includes a headset for the fisherman, and a signalling device on the assembly 10 that activates a special headset tone that is associated with a particular assembly 10. Thus, for example, a fisherman would receive a single tone for one assembly and a double tone for another assembly and so forth. The circuit elements will be mounted on the assembly 10 along with the other elements which will be discussed below. The exact details of the circuit used to accomplish this will not be discussed since those skilled in the art of signalling will be familiar with these details based on the teaching of this disclosure and standard textbooks. Such tones can be used in conjunction with the above-discussed light assemblies to further ensure that the fisherman is fully apprised of which assembly is sending the strike signal.

The light assemblies are normally off, and are activated when the reel 32 rotates to feed line out. The first light assembly 50 includes a very bright white light bulb 54 and a cover 56 which protects such bulb from the elements, while the second light assembly includes multi-colored light bulbs, such as red bulb 58 and orange bulb 59, and a flashing or blinking light bulb 60 that is mounted to extend axially of the tube while the other lights are mounted to extend radially of that tube. A transparent hemispherical shade 62 is mounted on the tube to protect the second light assembly, and the first light assembly is mounted on the insulation layer and extends through the top layer 26.

When a fish strikes the bait and begins to run, the line 42 feeds out and the reel 34 turns. As soon as the reel has turned a specified amount, the light assemblies are activated to indicate such a situation. Using suitable circuit elements, such as timers, sequence switches and the like, the light assemblies can be activated simultaneously or at different times to indicate various conditions, such as a nibble or a catch. Furthermore, the light assemblies can be activated upon initial rotation of the reel or only after that reel has rotated several times, or the first assembly can be activated upon initial rotation of the reel, and the second assembly can be activated after that reel has rotated a specified number of times. The multicolored lights in the second light assembly can be activated according to various conditions as well. Those skilled in the art will be able to determine what conditions are required based on the teaching of this disclosure.

Figure 2:
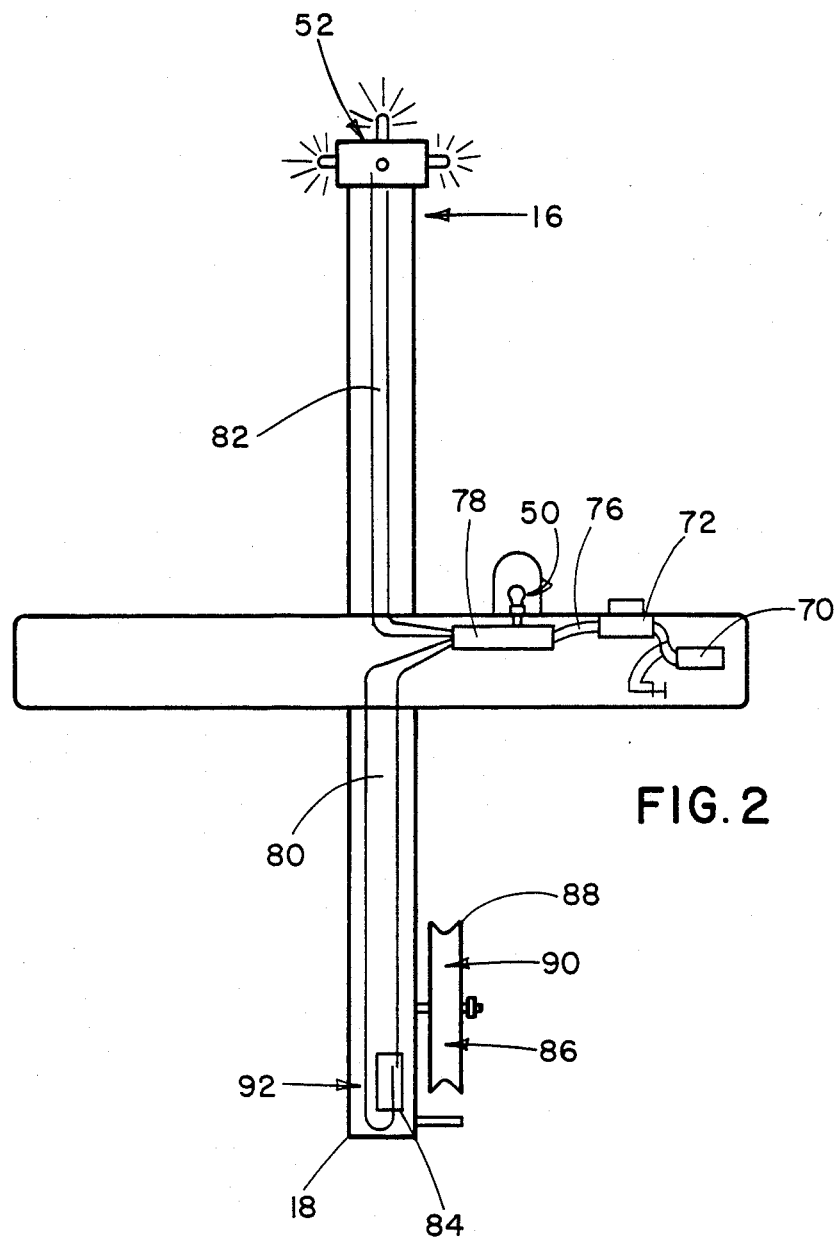
FIG. 2 is a cut away side elevational view of the assembly indicating the circuitry associated therewith.
Figure 3:
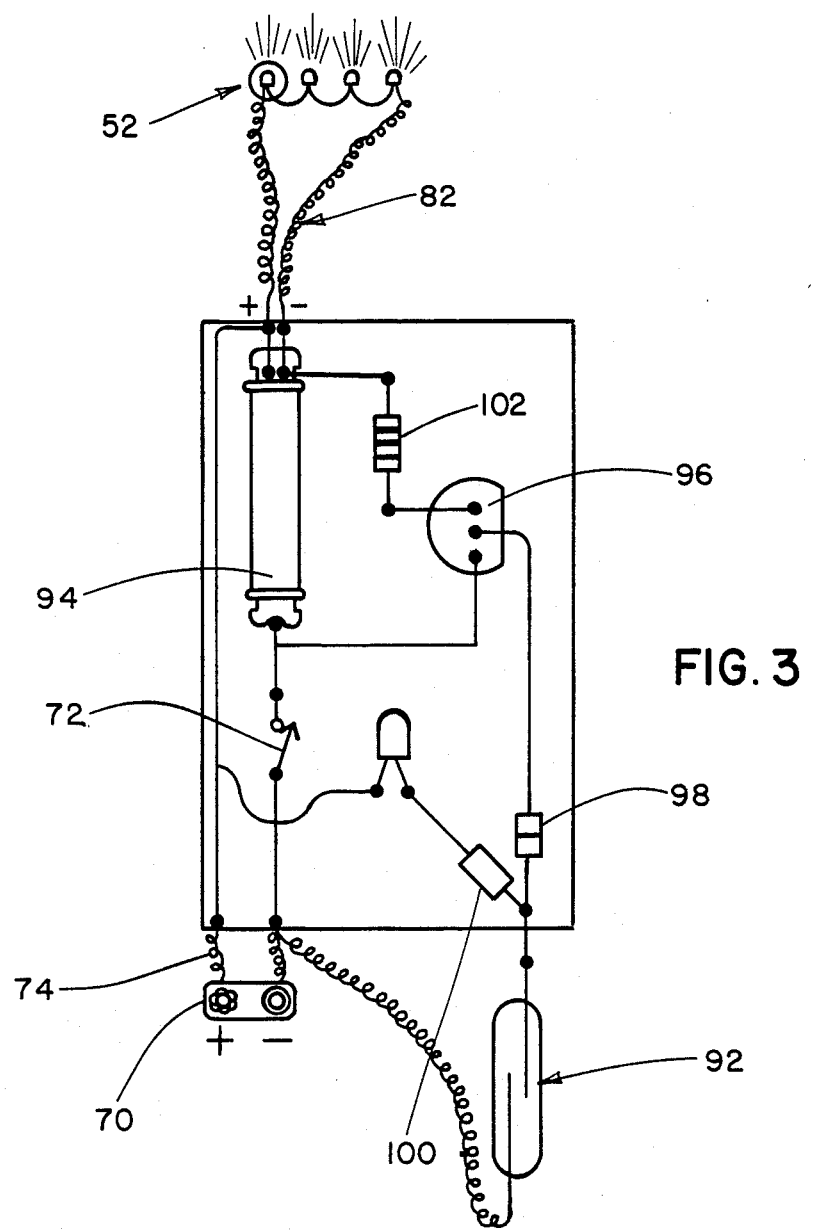
FIG. 3 is a diagram indicating the circuitry of the control unit associated with the ice fishing assembly.

As is best shown in FIGS. 2 and 3, the preferred control system of the assembly 10 includes a power source, such as a battery pack 70 mounted on the cover unit 24 and which is connected to the remainder of the circuit by an on/off switch 72 via leads 74. The on/off switch 72 is connected by leads 76 to a control panel 78 on which is mounted the first light assembly 50. Further leads, such as leads 80 and 82 connect the control panel 78 to a reel-motion sensing switch 84 and to the second light assembly 52, respectively.

The reel-motion sensing switch 84 includes a permanent magnet 86 mounted on flange 88 of the reel in a position opposite to a counterweight 90 also mounted on the reel to ensure proper rotational motion of the reel. The switch 84 also includes a magnetically-operated switch, such as reed switch 92, mounted in the central tube 16 near the bottom end 18 thereof. The switch 92 is of a normally open type that exposure thereof to the permanent magnet will close the contacts thereof, and such contacts will remain closed until the on/off switch is turned off so that once activated, the switch 92 will close the circuit path between the power sources and the light assemblies via the leads 80 and 82 and will keep that path closed until the on/off switch is turned off. The reel rotates in a plane that is parallel to a plane containing the central tube so that the permanent magnet will pass the switch upon a prescribed amount of rotation of the reel.

Various circuit elements, such as relay 94, one amp triac 96, diode 98 and resistors 100 and 102 are also included in the circuit to ensure proper operation thereof. Other circuit devices such as further relays and control switches can be included to control the above-discussed performance of the circuit. Such elements will not be discussed as those skilled in the electronic control art will be familiar with what is needed based on the teaching of the present disclosure, and from such standard textbooks as "Switching Circuits and Logical Design" by S. H. Caldwell and published by John Wiley & Sons in 1962, the disclosure of which is incorporated herein by reference.

The basic circuit components are embedded in the insulation layer 30, and thus if the outer layers of the hole covering unit are cut and replaced, the circuit elements, which can be expensive need not be replaced. The flexible nature of the insulation layer permits it to adapt to the shape of a fishing hole without being cut, and should the hole be larger than the insulation layer, the outer layers will serve to keep it open. Thus, only the outer layers need to be replaced, and such layers can be manufactured of relatively inexpensive materials, such as plastic or the like. Thus, the replaceable characteristic of the unit 24 need not be vitiated by expense, and the unit can thus be used to customize the fishing hole. The insulation layer can be fixedly mounted on the tube to support the other two layers in place since such layers are slidably mounted on the tube. Furthermore, the insulation layer, especially in combination with the other two layers, protects the circuit elements and the connections from exposure to the environment, and thus keeps the operation of the assembly 10 reliable.

Operation of the assembly is evident from the foregoing, and will thus only be briefly described. The assembly is customized to the size and shape of the hole defined in the ice by cutting the outer layers of the unit 24, and the reel 34 is set to feed out the desired amount of line and to have the counterweight 90 set next to the switch 92 with the permanent magnet 86 spaced from that switch. The on/off switch is turned on, and the device is set into the ice with the reel located in the water. The flexible insulation layer is deformed as necessary. As soon as a fish strikes the bait and begins to run, the reel will rotate, and as soon as the permanent magnet reaches the vicinity of the reed switch, that switch will close thereby activating the light assemblies or any other signalling device associated with the device.

It is understood that while certain forms of the present invention have been illustrated and described herein, it is not to be limited to the specific forms or arrangements of parts described and shown.

We claim:
1. An ice fishing assembly comprising:
 (A) a cylindrical tube having a top end, a bottom end and a wall connecting said ends together;
 (B) an ice fishing hole covering unit which includes
  (1) a top circular cover slidably mounted on said tube,
  (2) a bottom circular cover slidably mounted on said tube, and
  (3) a circular layer of flexible insulation fixedly mounted on said tube between said top and bottom layers;
 (C) a fishing line storage reel rotatably mounted on said tube near said tube bottom end to rotate in a plane that is parallel to a plane containing said tube and including
  (1) a handle,
  (2) a permanent magnet mounted on said reel, and
  (3) a counterweight mounted on said reel;
 (D) a fishing line guide mounted on said tube adjacent to said tube bottom end and between said tube bottom end and said spool;
 (E) a fish strike indicator system which includes
  (1) a power source mounted in said insulation layer,
  (2) an on/off switch mounted in said insulation layer and electrically connected to said power source,
  (3) a first light assembly mounted in said insulation layer,
  (4) a second light assembly mounted on said tube at said tube top end,
  (5) a switch mounted on said tube closely adjacent to said storage reel, said switch being normally open and closed when said permanent magnet is located closely adjacent thereto, and once closed remains closed until said on/off switch is turned off,
  (6) electrical control means mounted in said insulation layer for controlling operation of said fish strike indicator system, and
  (7) lead means connecting said electrical control means to said first and second light assemblies and to said power source via said tube-mounted switch and said on/off switch whereby said light assemblies are activated when said tube-mounted switch is closed and said on/off switch is on.

2. The ice fishing assembly defined in claim 1 wherein said second light source includes a blinking light.

3. The ice fishing assembly defined in claim 2 wherein said second light assembly includes multi-colored lights.

4. The ice fishing assembly defined in claim 3 wherein said layer of insulation includes foam rubber.

5. The ice fishing assembly defined in claim 4 wherein said top and bottom layers of said ice fishing hole covering unit are concentric with each other.

6. The ice fishing assembly defined in claim 5 further including a hemispherical shade mounted on said tube top end and partially covering said second light assembly.

7. The ice fishing assembly defined in claim 6 further including a transparent cover mounted over said first light assembly.

8. The ice fishing assembly defined in claim 7 wherein said multi-colored lights include a red light and an orange light.

9. The ice fishing assembly defined in claim 8 further including a cap on said tube top end with said second light assembly mounted on said cap.

10. The ice fishing assembly defined in claim 9 wherein said second light source includes a blinking light mounted on said tube to extend axially thereof with said multi-colored lights being mounted on said cap to extend radially of said tube.

11. The ice fishing assembly defined in claim 10 wherein said control means includes remote signalling means.

12. The ice fishing assembly defined in claim 11 wherein said top and bottom circular layers are plastic.

13. The ice fishing assembly defined in claim 12 further including an audible signalling means connected to said tube-mounted switch to be activated by said tube-mounted switch.

14. The ice fishing assembly defined in claim 13 wherein said tube-mounted switch is a reed switch.

15. The ice fishing assembly defined in claim 14 wherein said audible means includes a headset connected to said remote signalling means.

* * * * *